(12) United States Patent
Matsumoto et al.

(10) Patent No.: US 10,560,762 B2
(45) Date of Patent: Feb. 11, 2020

(54) SENSING SYSTEM, SENSING METHOD, AND CONCENTRATOR

(71) Applicant: Hitachi, Ltd., Tokyo (JP)

(72) Inventors: Hisanori Matsumoto, Tokyo (JP); Yutaka Okuyama, Tokyo (JP); Akira Kuriyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 130 days.

(21) Appl. No.: 15/935,076

(22) Filed: Mar. 26, 2018

(65) Prior Publication Data

US 2019/0028782 A1  Jan. 24, 2019

(30) Foreign Application Priority Data

Jul. 19, 2017  (JP) ................................ 2017-139979

(51) Int. Cl.
*H04Q 9/00* (2006.01)

(52) U.S. Cl.
CPC ........... *H04Q 9/00* (2013.01); *H04Q 2209/40* (2013.01)

(58) Field of Classification Search
CPC ............. H04Q 9/00; H04Q 9/02; G01D 4/004
USPC ...................................... 340/870.07, 870.02
See application file for complete search history.

(56) References Cited

U.S. PATENT DOCUMENTS

| | | | | |
|---|---|---|---|---|
| 5,263,080 A | * | 11/1993 | Jones | H04M 17/00 370/236 |
| 5,606,600 A | * | 2/1997 | Elliott | H04M 3/36 379/112.01 |
| 2005/0098955 A1 | * | 5/2005 | Rasmussen | G07F 17/32 273/430 |
| 2008/0186201 A1 | * | 8/2008 | Wang | G01D 4/004 340/870.03 |
| 2013/0010781 A1 | * | 1/2013 | Gresset | H04J 3/0605 370/350 |
| 2016/0261481 A1 | | 9/2016 | Ogata et al. | |
| 2018/0242058 A1 | * | 8/2018 | Hayakawa | H04Q 9/02 |
| 2019/0020621 A1 | * | 1/2019 | Wu | H04L 5/0055 |

FOREIGN PATENT DOCUMENTS

| | | |
|---|---|---|
| JP | 2016-163242 A | 9/2006 |
| JP | 2017-041159 A | 2/2017 |

* cited by examiner

*Primary Examiner* — Albert K Wong
(74) *Attorney, Agent, or Firm* — Mattingly & Malur, PC

(57) ABSTRACT

A sensing system includes: a wireless sensor terminal that includes a sensor, a processor, and a memory; and a concentrator that includes a processor and a memory and is connected to the wireless sensor terminal. In the sensing system, the wireless sensor terminal includes a first signal processing unit that processes sensor data measured by the sensor, and a first wireless communication unit that transmits the data output by the first signal processing unit. The concentrator includes a second wireless communication unit that communicates with the first wireless communication unit, and a second signal processing unit that calculates a feature quantity based on the data received from the wireless sensor terminal, determines a principal component according to the feature quantity by a principal component analysis, and generates a principal component list corresponding to the principal component.

15 Claims, 8 Drawing Sheets

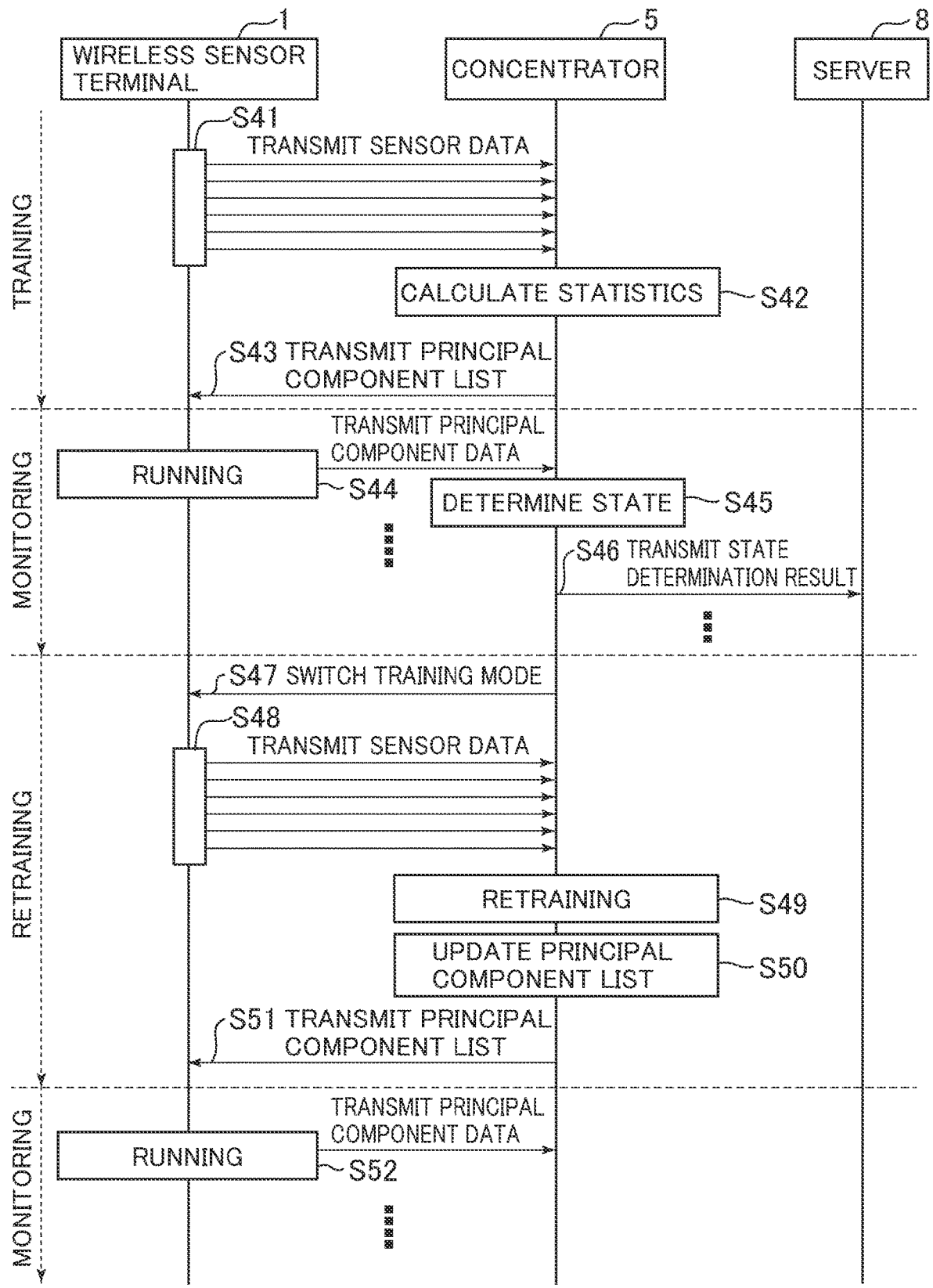

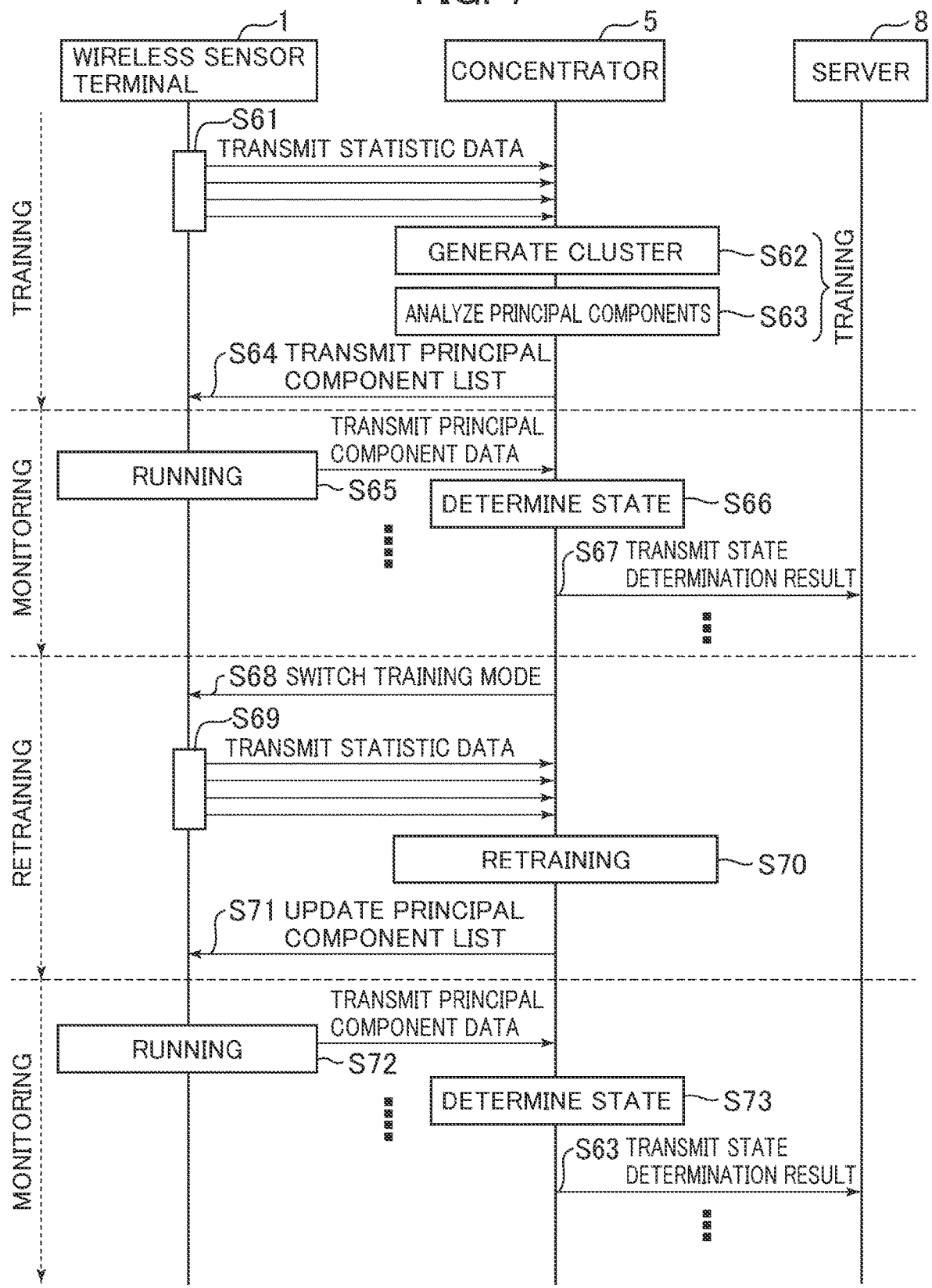

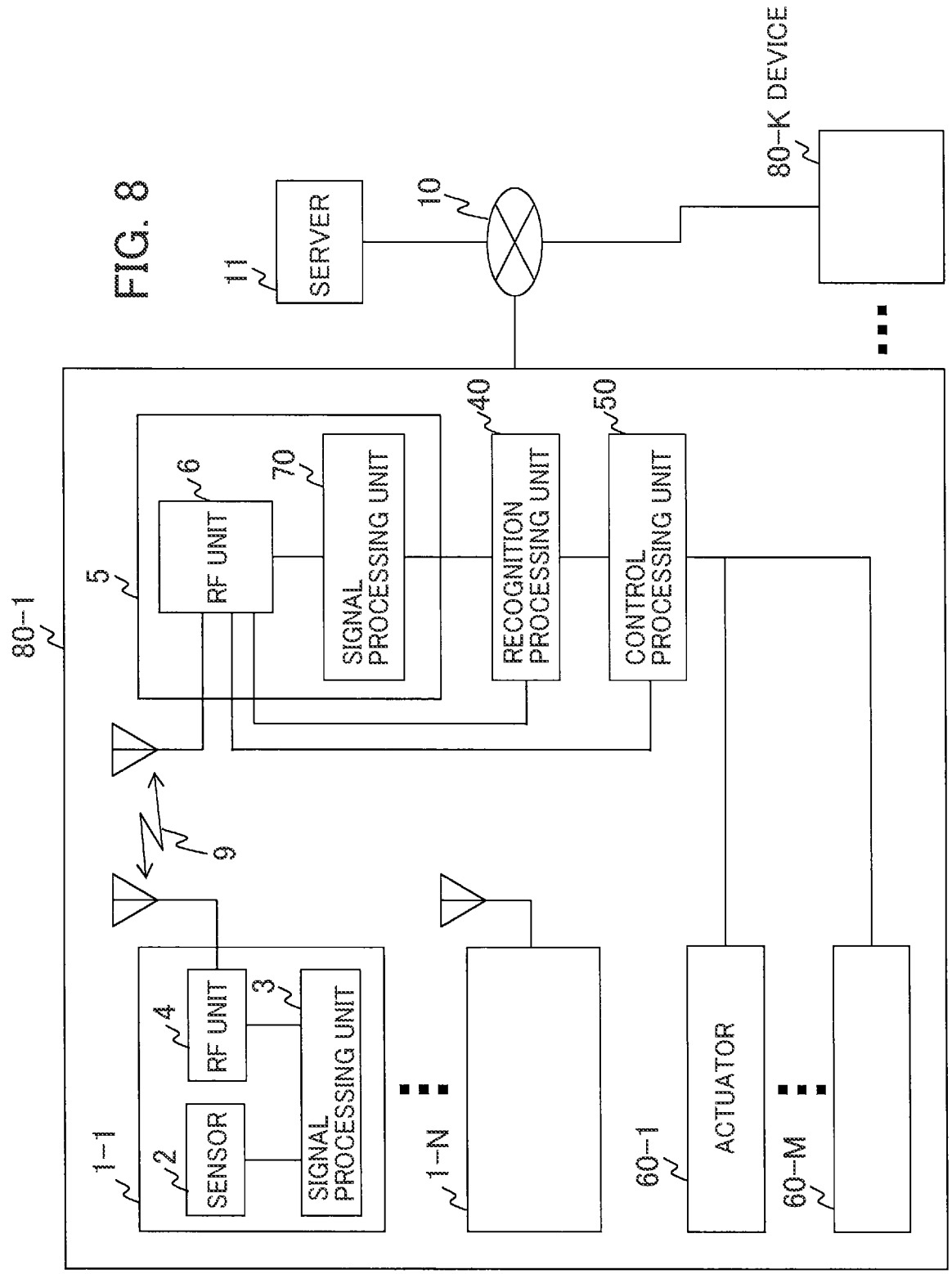

SENSING SYSTEM, SENSING METHOD, AND CONCENTRATOR

CLAIM OF PRIORITY

The present application claims priority from Japanese patent application JP 2017-139979 filed on Jul. 19, 2017, the content of which is hereby incorporated by reference into this application.

BACKGROUND

The present invention relates to a sensing system having multiple wireless sensor terminals.

In recent years, with the progress of IoT (Internet of Things) called mono Internet, businesses and services over communication are diversified and various devices and services are connected to each other over a network.

Even in control systems for important infrastructure and industries, there is a trend to streamline the monitoring of devices to be controlled (motors, pumps, generators, and so on) which are operating and the operation of the control systems by controlling the devices over the network, or acquiring data of sensors that are installed in the devices and observe surrounding situations over the network.

In order to monitor existing production equipment and others over the network, wireless sensor terminals that do not require power wiring and communication wiring are installed at various places, thereby being capable of monitoring and controlling the existing production equipment over the network.

Since wireless sensor terminals receive a power supply from batteries or small power generation devices, there is a need to reduce power consumption in order to operate for a long period of time. For that reason, there has been known a technique in which a granularity of sensor data transmitted by the wireless sensor terminals is changed according to a state of a monitoring target to reduce the power consumption (for example, Japanese Unexamined Patent Application Publication No. 2016-163242).

Japanese Unexamined Patent Application Publication No. 2016-163242 discloses the technique in which a server transmits a collection rule to a gateway and the gateway controls the granularity of the sensor data so as to satisfy the collection rule when an abnormality or a presage of abnormality occurs in the monitoring target.

In addition, a technique has also been known in which when a large number of wireless sensor terminals are connected to the gateway that collects the sensor data, in order to reduce an excessive traffic of the wireless network, the wireless sensor terminal processes the sensor data and then transmits the processed sensor data to the gateway (for example, Japanese Unexamined Patent Application Publication No. 2017-41159).

Japanese Unexamined Patent Application Publication No. 2017-41159 discloses the technology in which after the measured sensor data is subjected to a predetermined process to compress a data size, the compressed data size is transmitted to an analysis unit of the sensor data to transfer the sensor data under a limited transfer capacity.

SUMMARY

A large number of production facilities are installed in a factory, and various sensors such as vibration (acceleration), pressure, temperature, rotation speed, voltage, or current are adopted as the sensors of the wireless sensor terminals installed in the production facilities. The sensor data measured by those sensors are collected by a concentrator as the gateway and transferred to the server. The server detects states of the production facilities from the respective sensor data.

In order to reduce the power consumption as described above, the wireless sensor terminal does not transfer the measured sensor data as it is to the concentrator, but it is desirable that the wireless sensor terminal processes the sensor data by a predetermined process and compresses the data amount as disclosed in Japanese Unexamined Patent Application Publication No. 2017-41159.

However, there are a wide variety of components such as a motor, a compressor, a pump, and a pipe, in which the wireless sensor terminals are installed for monitoring the production equipment, and there are a wide variety of manufacturers, models and specifications of each component.

For that reason, when a process of processing and compressing the sensor data is unified by a single process regardless of the type of the sensor mounted on the wireless sensor terminal, the production facility in which the wireless sensor terminal is installed, and the component of the production facility as disclosed in Japanese Unexamined Patent Application Publication No. 2017-41159, the server that processes the processed sensor data may not be able to accurately detect the state of the production facility.

In other words, there are a case where a feature quantity of the sensor data in a time axis direction is important and a case where a feature quantity of the sensor data in a frequency direction is important, depending on the type of the sensor and the type of the component. In order for the server to accurately detect the state of the production facility, there is a need to process the sensor data in an optimal manner according to the type of sensor and the type of component.

However, as described above, a wide variety of production facilities are operating in a factory and the like, and there is a problem that a lot of labor is required to determine a method of processing the sensor data for each of the wireless sensor terminals according to the type of the sensor and the type of the component, and set an optimum processing method.

Therefore, the present invention has been made in view of the above problems, and an object of the present invention is to easily set an optimum method of processing sensor data irrespective of a difference in the type of a sensor mounted on a wireless sensor terminal or a monitoring target of a wireless sensor terminal.

According to the present invention, there is provided a sensing system including: a wireless sensor terminal that includes a sensor, a processor, and a memory; and a concentrator that includes a processor and a memory and is connected to the wireless sensor terminal, in which the wireless sensor terminal includes: a first signal processing unit that processes sensor data measured by the sensor; and a first wireless communication unit that transmits the data output by the first signal processing unit, and the concentrator includes: a second wireless communication unit that communicates with the first wireless communication unit; and a second signal processing unit that calculates a feature quantity based on the data received from the wireless sensor terminal, determines a principal component according to the feature quantity by a principal component analysis, and generates a principal component list corresponding to the principal component.

Therefore, according to the present invention, an optimum method of processing the sensor data according to a difference in the type of the sensor mounted on the wireless sensor terminal and the monitoring target of the wireless sensor terminal can be extremely easily set, thereby being capable of improving availability of the sensing system.

BRIEF DESCRIPTION OF THE DRAWINGS

FIG. 6 is a sequence diagram showing an example of a process that is performed in a sensing system according to a third embodiment of the present invention;

FIG. 7 is a sequence diagram showing an example of a process that is performed in a sensing system according to a fourth embodiment of the present invention; and FIG. 8 is a block diagram showing an example of a sensing system according to a fifth embodiment of the present invention.

DETAILED DESCRIPTION

Figure 1:
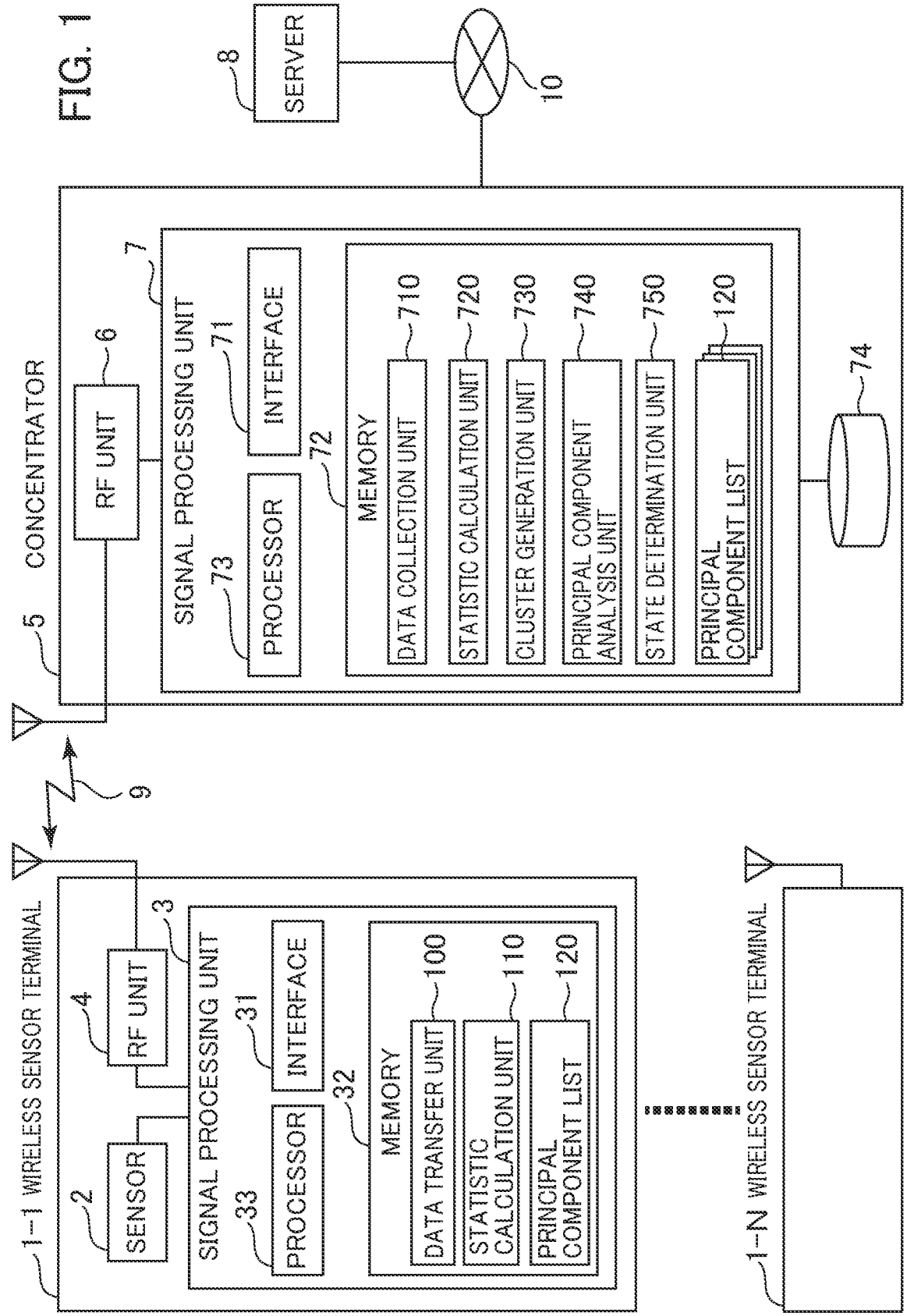
FIG. 1 is a block diagram showing an example of a sensing system according to a first embodiment of the present invention.

Hereinafter, embodiments of the present invention will be described with reference to the accompanying drawings.
First Embodiment FIG. 1 is a block diagram showing an example of a sensing system according to a first embodiment of the present invention. The sensing system includes wireless sensor terminals 1-1 to 1-N which are installed in a facility to be monitored, a concentrator 5 that is connected to the wireless sensor terminals 1-1 to 1-N over a wireless network 9, and a server 8 that is connected to the concentrator 5 over a network 10. In the following description, when referring to the whole terminal, a reference numeral "1" having no suffix after "-" is used.

The wireless sensor terminal 1 transmits sensor data measured by a sensor 2 which measures a predetermined physical quantity or statistical data (principal component data) obtained by processing the sensor data to the concentrator 5. As will be described later, the wireless sensor terminal 1, the wireless sensor terminal 1 has two modes and operates in any one of a training mode for starting use or a monitoring mode for executing monitoring of the facility. The wireless sensor terminal 1 switches between those two modes in response to a command from the concentrator 5.

Upon receiving the sensor data from the wireless sensor terminal 1 in the training mode, the concentrator 5 calculates a predetermined statistic as will be described later, executes clustering and principal component analysis of the statistic, generates a principal component list 120, and transmits the generated principal component list 120 to the wireless sensor terminal 1.

Upon receiving the principal component list 120 from the concentrator 5, the wireless sensor terminal 1 switches to the monitoring mode. The wireless sensor terminal 1 sets a statistic (principal component) for processing the sensor data based on the principal component list 120, calculates statistical data (principal component data) corresponding to the principal component according to the sensor data, and transmits the calculated statistical data to the concentrator 5.

The concentrator 5 determines whether there is abnormality or a presage of the abnormality in the statistical data received from the wireless sensor terminal 1 in the monitoring mode, and transfers the determination result to the server 8 as a state determination result. The server 8 determines a state of the facility to be monitored based on the state determination results received from the respective wireless sensor terminals 1-1 to 1-N.

The first embodiment shows an example in which the concentrator 5 determines the state of the statistical data of each wireless sensor terminal 1. However, the present invention is not limited to the above example. For example, the concentrator 5 may transfer the statistical data to the server 8. The server 8 may determine whether there is abnormality or the presage of abnormality in the statistical data or not, and may further determine the state of the facility to be monitored.

<Wireless Sensor Terminal>

The wireless sensor terminal 1 includes a sensor 2 for measuring a predetermined physical quantity, a signal processing unit 3 for processing the sensor data measured by the sensor 2, and an RF unit 4 for performing transmission and reception between the signal processing unit 3 and the wireless network 9.

The signal processing unit 3 includes a processor 33 for performing arithmetic processing, a memory 32 for storing programs and data, and an interface 31 for transmitting and receiving signals to and from the sensor 2 and the RF unit 4. The memory 32 holds a data transfer unit 100 that acquires the sensor data from the sensor 2 and transfers processing results of the sensor data, a statistic calculation unit 110 that calculates principal component data as the statistic according to the sensor data, and a principal component list 120 received from the concentrator 5.

The respective functional units of the data transfer unit 100 and the statistic calculation unit 110 are loaded into the memory 32 as programs.

The processor 33 operates as a functional unit that provides a predetermined function by processing according to the program of each functional unit. For example, the processor 33 functions as the statistic calculation unit 110 by processing according to a statistic calculation program. The same is applied to the other programs. Further, the processor 33 also operates as functional units that provide the respective functions of the multiple processes to be executed by the respective programs. The computer and the computer system include a device and a system including those functions.

Information on programs and tables for implementing the respective functions of the signal processing unit 3 can be stored in a storage device such as a nonvolatile semiconductor memory, a hard disk drive, or an SSD (solid state drive) not shown or a computer-readable non-transitory data storage medium such as an IC card, an SD card, or a DVD.

The statistic calculation unit 110 calculates the statistic (principal component) designated in the principal component list 120. In the first embodiment, a statistic of 12 indicated below is set to be calculable by the statistic calculation unit 110.

(1) $N_0$: zero crossing (the number of times by which the sensor data crosses zero within a unit time)
(2) $\sigma$: standard deviation
(3) x_max: maximum value
(4) p1: effective value $$p_1 = \sqrt{\frac{\sum_{i=1}^{N} x_i^2}{N}} \quad [\text{Ex. 1}]$$

where i=1 to N.
(5) p2: average value of peaks of absolute values $$p_2 = \frac{\sum_{i=1}^{N_P} |x_i|_P}{N_P} \quad [\text{Ex. 2}]$$

where $|x_i|_p$=local maximum value of absolute value, $N_p$=total number of local maximum values of absolute values.
(6) p3: skewness $$p_3 = \frac{\sum_{i=1}^{N} (x_i - \overline{x_i})^3}{N\sigma^3} \quad [\text{Ex. 3}]$$

(7) p4: kurtosis $$p_4 = \frac{\sum_{i=1}^{N} (x_i - \overline{x_i})^4}{N\sigma^4} \quad [\text{Ex. 4}]$$

(8) p5: Normalization of the average value of peaks of absolute values $$p_5 = p_2/\sigma \quad [\text{Ex. 5}]$$

(9) p6: Incidence rate of local maximum value $$p_6 = N_{+P}/N_0 \quad [\text{Ex. 6}]$$

where $N_{+P}$=total number of local maximum values.
(10) p7: incidence rate of local minimum values $$p_7 = N_{-P}/N_0 \quad [\text{Ex. 7}]$$

where $N_{-P}$=total number of local minimum values.
(11) p8: sum of spectral values $$p_8 = \sum_{i=1}^{I} F(f_i) \quad [\text{Ex. 8}]$$

where $f_i$=total number of local minimum values of frequencies (i=1 to 1)
(12) p9: sum of spectrum square values $$p_9 = \sqrt{\sum_{i=1}^{I} F^2(f_i)} \quad [\text{Ex. 9}]$$

where $F(f_i)$=spectrum values on $f_i$ circumference.

The above items (1) to (10) show statistics in a time domain and the items (11) and (12) show statistics in a frequency domain. The statistic calculation unit 110 calculates the statistics of the sensor data values for a predetermined number (for example, three) of the principal components (statistics) designated by the principal component list 120, and outputs the calculated statistics as the principal component data.

In the first embodiment, in the training mode, the data transfer unit 100 transfers the sensor data as it is to the concentrator 5, and in the monitoring mode, the data transfer unit 100 transmits the principal component data calculated by the statistic calculation unit 110 every predetermined time (for example, 100) to the concentrator 5.

The wireless sensor terminal 1 is driven by a battery or a small-sized power generation device not shown. In the training mode, because the data transfer is performed according to the sampling frequency (for example, 20 kHz) of the sensor 2, the power consumption increases. On the other hand, in the monitoring mode, the data transfer is performed at a transmission interval of every predetermined time (for example, 100 msec) so that the power consumption can be reduced.

<Concentrator>

The concentrator 5 includes an RF unit 6 that communicates with the wireless sensor terminal 1 over the wireless network 9, a signal processing unit 7 that processes the sensor data or the principal component data received from the wireless sensor terminal 1 and transmits the processing result to the server 8 over the network 10, and a storage 74 that stores data and programs.

The signal processing unit 7 includes a processor 73 that performs arithmetic processing, a memory 72 that stores programs and data, and an interface 71 that transmits and receives signals to and from the RF unit 6 and the network 10.

The memory 72 stores a data collection unit 710 for collecting the sensor data or the principal component data from the wireless sensor terminals 1-1 to 1-N, a statistic calculation unit 720 for calculating the statistics from the sensor data, a cluster generation unit 730 that generates a cluster from the statistics, and a principal component analysis unit 740 that implements the principal component analysis with the use of the generated cluster, determines the principal components of each of the wireless sensor terminals 1-1 to 1-N, and generates the principal component list 120. The memory 72 also stores a state determination unit 750 for determining the state according to the principal component data received from the wireless sensor terminal 1, and the generated principal component list 120.

The principal component list 120 generated by the concentrator 5 is transmitted to each of the wireless sensor terminals 1 and held in the signal processing unit 3.

The respective functional units of the data collection unit 710, the statistic calculation unit 720, the cluster generation unit 730, the principal component analysis unit 740, and the state determination unit 750 are loaded as programs in the memory 72.

The processor 73 operates as a functional unit that provides a predetermined function by processing according to the program of each functional unit. For example, the processor 73 functions as a statistic calculation unit 720 by processing according to the statistic calculation program. The same is applied to other programs as well. Further, the processor 73 also operates as a functional unit that provides each function of multiple processes to be executed by the respective programs. The computer and the computer system include a device and a system including those functions.

Information on programs and tables for implementing the respective functions of the signal processing unit 7 can be stored in the storage 74, a storage device such as a nonvolatile semiconductor memory, a hard disk drive, or an SSD (solid state drive) not shown, or a computer-readable non-transitory data storage medium such as an IC card, an SD card, or a DVD.

The statistic calculation unit 720 is similar to the statistic calculation unit 110 of the wireless sensor terminal 1 and is capable of calculating predetermined statistics of the above items (1) to (12). According to the first embodiment, in the training mode of the wireless sensor terminal 1, the statistic calculation unit 720 calculates the statistic of the above item (12) for the sensor data received from the wireless sensor terminal 1.

The cluster generation unit 730 clusters the statistics (1) to (12) calculated by the statistic calculation unit 720 during a period of the training mode for each of the wireless sensor terminals 1 to generate 12 clusters. Since the clustering may be performed by applying a well-known or known technique, the clustering will not be described in this example in detail.

The principal component analysis unit 740 performs the principal component analysis on the generated 12 clusters to calculate the dispersion of the respective clusters. Then, the principal component analysis unit 740 sorts the dispersion of the clusters corresponding to the above items (1) to (12) in descending order, and selects top several (for example, top three) principal components from the principal components with larger dispersion (or dispersion rate) as the principal components (statistics) for processing the sensor data.

The principal component analysis unit 740 generates the principal component list 120 storing the selected principal components (statistics), and transmits the principal component list 120 for each of the wireless sensors terminal 1. Since the principal component analysis may be performed by applying a well-known or known technique, the principal component analysis will not be described in this example in detail.

Upon receiving the principal component list 120, the wireless sensor terminal 1 sets the statistic for processing the sensor data based on the principal component stored in the principal component list 120, and starts the monitoring mode. In the monitoring mode, the wireless sensor terminal 1 transmits, to the concentrator 5, the statistics selected as the principal components (for example, standard deviation σ, effective value p1, skewness p3) from the sensor data acquired by the statistic calculation unit 110 for a predetermined time (for example, 100 msec) as operators, and those statistics as the principal component data.

The state determination unit 750 determines whether or not there is abnormality or the presage of abnormality in the principal component data received from the wireless sensor terminal 1 in the monitoring mode. In the determination, the state determination unit 750 generates a state determination result including the abnormality or the presage of abnormality for the principal component data that exceeds a predetermined threshold for each of the statistics of the above items (1) to (12), and transmits the generated state determination result to the server 8.

The server 8 determines whether there is the abnormality or the presage of abnormality of the facility or not, based on the state determination result of the wireless sensor terminals 1-1 to 1-N.

<Process>

Figure 2:
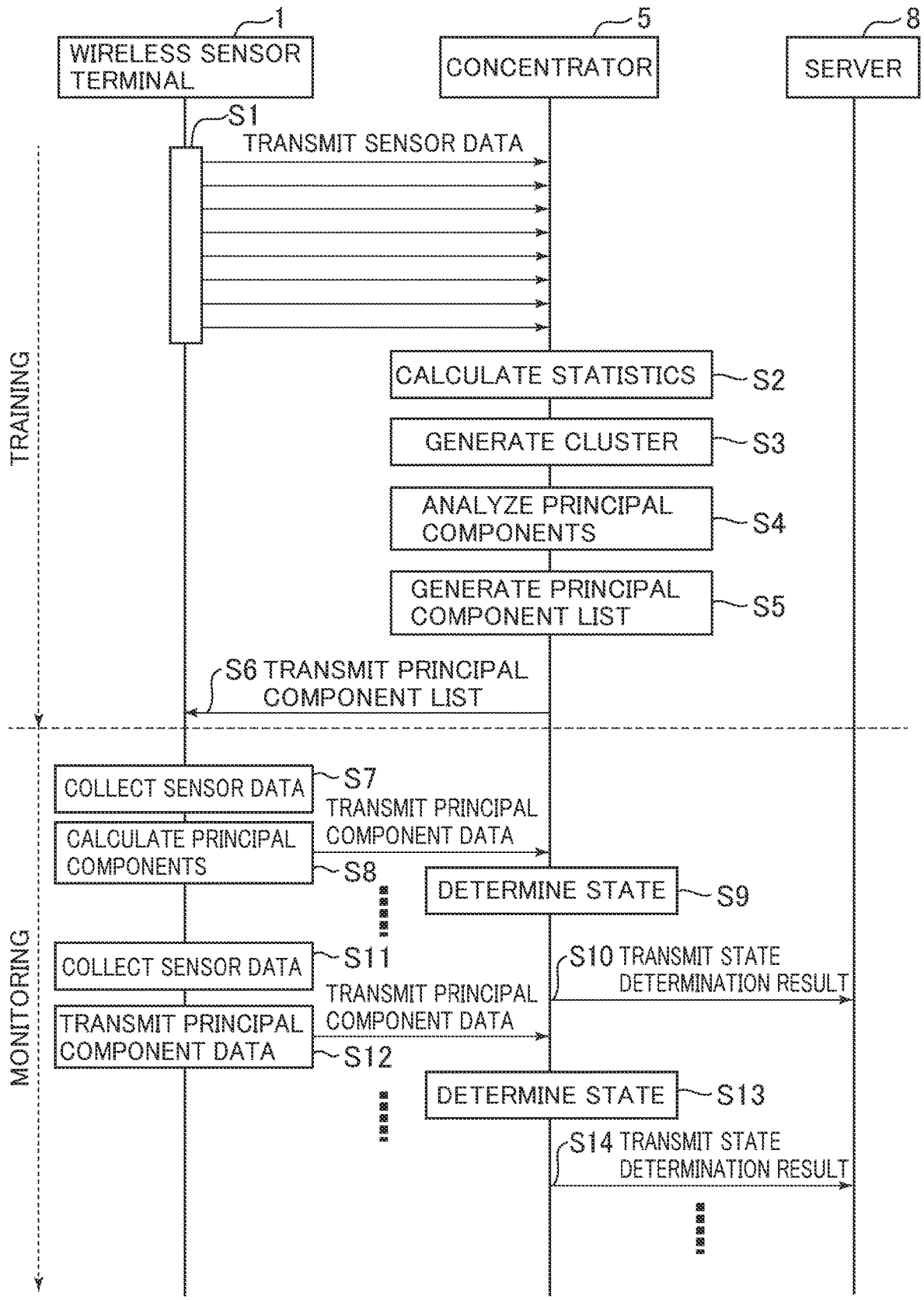
FIG. 2 is a sequence diagram showing an example of a process that is performed in the sensing system according to the first embodiment of the present invention.

FIG. 2 is a sequence diagram showing an example of a process to be performed in the sensing system according to the first embodiment of the present invention. The sensing system of the first embodiment includes a training period during which the concentrator 5 determines the principal component of the sensor data measured by the wireless sensor terminal 1 after the wireless sensor terminal 1 has been installed in the equipment to be monitored, and a monitoring period during which the concentrator 5 determines the principal component for each of the wireless sensor terminals 1, notifies each of the wireless sensor terminals 1 of the principal component list 120, and actually transmits the principal component data.

The training period varies depending on the facility and the sensor 2 of the wireless sensor terminal 1, and a period such as half a day to several days can be preset in the concentrator 5 by an administrator or the like.

The wireless sensor terminal 1 installed in the equipment to be monitored operates in the training mode and transmits the data measured by the sensor 2 to the concentrator 5 as it is (S1). The concentrator 5 accumulates the received sensor data until a predetermined accumulation period (for example, one day) has elapsed.

When the predetermined accumulation period has elapsed, the concentrator 5 calculates the statistics of the above items (1) to (12) for the accumulated sensor data (S2). Next, the concentrator 5 clusters the respective statistics of the above items (1) to (12), and creates the clusters (S3).

The concentrator 5 implements the principal component analysis on the respective clusters of the above items (1) to (12) to calculate the dispersion of the respective clusters. The concentrator 5 sorts the dispersion of the respective clusters in descending order, and selects the statistics from a top to a predetermined rank (for example, third rank) as the principal components (S4).

The concentrator 5 generates the principal component list 120 storing the selected principal components (statistics) and transmits the generated principal component list 120 to the wireless sensor terminal 1 (S5). When the wireless sensor terminal 1 receives the principal component list 120, the wireless sensor terminal 1 selects a statistic for processing the sensor data based on the principal components set in the principal component list 120, and starts the monitoring mode.

The wireless sensor terminal 1 collects the sensor data in a predetermined collection period (for example, 100 msec or the number of sensor data=2K) (S7). The wireless sensor terminal 1 calculates the statistics defined in the principal component list 120 for the collected sensor data every time the collection period elapses, and transmits the multiple statistics together as the principal component data to the concentrator 5 (S8).

Upon receiving the principal component data, the concentrator 5 compares the multiple statistics included in the principal component data with respective preset threshold values to determine whether there is abnormality or a presage of abnormality or not (S9). The concentrator 5 generates a state determination result including the abnormality or the presage of abnormality, and transmits the result to the server 8 (S10).

Thereafter, as shown in Steps S11 to S14, the sensing system repeats the processes in Steps S7 to S10 for each predetermined collection period to continue the monitoring of the facility.

In the training period, when the wireless sensor terminal 1 sets a sampling frequency of the sensor 2 to 20 KHz, and sets one sensor data to 2 bytes, the data amount in the collection period of 100 msec is 4 K bytes.

On the other hand, in the monitoring period, since the wireless sensor terminal 1 calculates each of three statistics by 2 bytes as the principal component data every collection period of 100 msec, the principal component data to be transferred at once is 6 bytes. As a result, in the monitoring period, the amount of data becomes 3/2000 as compared with that in the training period, and an electric power consumed by the RF unit 4 can be reduced.

With the above processing, the cluster generation and the principal component analysis are performed on the multiple statistics (1) to (12) set in advance for the sensor data output from the wireless sensor terminal 1, and the dispersion of the generated clusters is compared with each other, thereby being capable of learning the statistics with high sensitivity (large dispersion). Then, predetermined higher statistics with the large dispersion are selected as the principal components of the sensor data to exclude the statistics that do not contribute much to the determination of the state using the sensor data, thereby being capable of improving an accuracy of the state determination and improving a data compression ratio.

Figure 3:
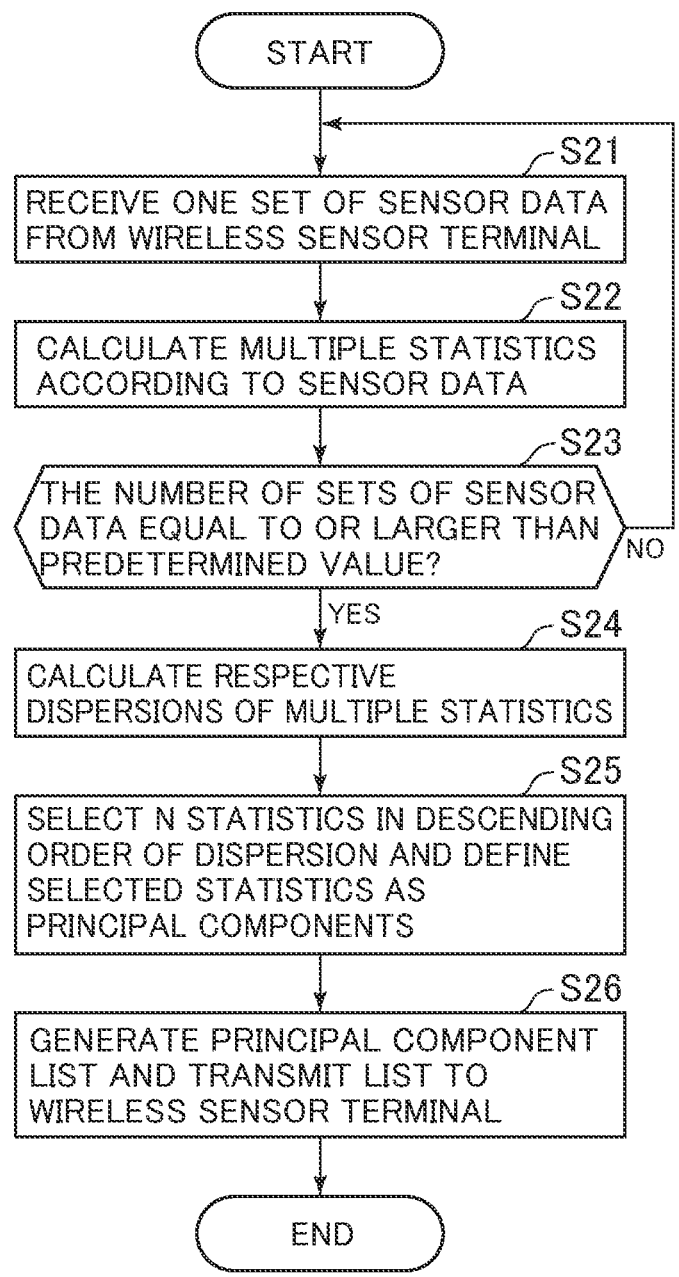
FIG. 3 is a flow chart showing an example of a process that is performed in a concentrator according to the first embodiment of the present invention.

FIG. 3 is a flowchart showing an example of a process to be performed by the concentrator according to the first embodiment of the present invention. The process is a process performed in Steps S1 to S6 of FIG. 2.

First, the concentrator 5 receives one set of sensor data from the wireless sensor terminal 1 (S21). In the first embodiment, one set of sensor data is 2 bytes of data.

Next, the concentrator 5 calculates the respective statistics of the above items (1) to (12) for the received sensor data (S22). The concentrator 5 determines whether or not the number of sets of the received sensor data is equal to or larger than a predetermined value (for example, for one day). If the number of sets of the received sensor data is equal to or larger than the predetermined value, the process proceeds to Step S24, and if not, the process returns to Step S21 and the above process is repeated.

The concentrator 5 clusters each of the calculated multiple statistics and then performs the principal component analysis to calculate the dispersion (S24). Then, the concentrator 5 selects N statistics in descending order of the dispersion, and defines the selected statistics as the principal components (S25).

The concentrator 5 generates the principal component list 120 including the N statistics, and transmits the principal component list 120 to the wireless sensor terminal 1.

In the above description, the sensor data is collected until the number of sets of the sensor data becomes equal to or larger than the predetermined value. Alternatively, as shown in FIG. 2, the above process may be performed until a predetermined accumulation period has elapsed.

As described above, in the first embodiment, the concentrator 5 clusters the multiple statistics set in advance for the collected sensor data and then calculates the dispersion by the principal component analysis, to thereby select the statistics higher in sensitivity (larger in dispersion) by a predetermined number.

This makes it to narrow down the principal components with the higher sensitivity among the multiple statistics calculated from the sensor data and to improve the determination accuracy of whether there is the abnormality or the presage of abnormality or not, which is performed based on the principal component data.

Since the concentrator 5 determines the principal component data with the dispersion of clustering the sensor data, the optimum principal component data can be automatically set for the wireless sensor terminal 1 by training regardless of a difference in the kind of the sensor 2, a difference in the physical quantity to be measured, and a difference in the facility to be monitored.

With the above configuration, in a factory or the like having a large number of facilities, when the wireless sensor terminal 1 is installed to monitor the facility, the optimum principal component for abnormality detection can be automatically set, and the sensing system can be extremely easily structured.

Further, since the concentrator 5 can automatically set the principal component data irrespective of the difference in the kind of the sensor 2 of the wireless sensor terminal 1 to be connected or the difference in the facility, the sensing system can be structured easily and quickly, thereby being capable of providing the highly available sensing system.

In addition, since an administrator of the wireless sensor terminal 1 and the concentrator 5 can automatically set the principal component data without requiring special knowledge on the sensor 2 of the wireless sensor terminal 1, the sensing system that is extremely easy in handing can be provided.

In order to more specifically show the sensing system of the first embodiment, a case will be described where an operating state of a processing machine used in, for example, a mass production factory is estimated by monitoring a vibration state of the processing machine. An acceleration sensor is attached as the sensor 2 to an inside of a housing of the processing machine to be measured or an outside surface of the housing. The acceleration sensor is a component of the wireless sensor terminal 1-1, and is structured to be drawn from the housing of the wireless sensor terminal 1-1 by a signal cable. In the training mode, the wireless sensor terminal 1-1 transmits raw data of an acceleration (for example, data sampled at 16 bits and 100 kbps) acquired by the sensor 2 to the concentrator 5 by the RF unit 4.

A transmission frequency is to transmit the sampling data, for example, for one second at intervals of one minute. Therefore, if one wireless sensor terminal is provided, when the wireless sensor terminal continues for 24 hours, 1440 data sets are accumulated in the concentrator 5. The concentrator 5 calculates the statistics (1) to (12) described above based on the raw data of the acceleration. When the training mode is continued for one week, 10080 data sets are accumulated in the concentrator 5 and expressed as 10080 sample points plotted in a 12-dimensional coordinate space using the statistics (1) to (12). As a result of investigating the statistics which are highly sensitive to a change in the operating state of the processing machine by the principal component analysis with the use of the above data, $\sigma$, $N_0$, and p3 are extracted, for example, as the top three principal components.

The concentrator 5 generates [$\sigma$, $N_0$, p3] as the principal component list and transmits the generated $\sigma$, $N_0$, and p3 to the wireless sensor terminal 1-1. Thereafter, in the monitoring mode, the wireless sensor terminal 1-1 calculates $\sigma$, $N_0$, and p3, which are principal components recorded in the principal component list by the signal processing unit 3 from the raw data acquired by the signal processing unit 3, and transmits the calculation result to the concentrator 5 through the RF unit 4.

With the above procedures, the amount of data to be wirelessly transmitted can be greatly reduced in the monitoring mode.

Second Embodiment

In a second embodiment, when the coordinate axes of the principal components selected in the first embodiment are tilted, the precision of the abnormality detection is improved by rotating the coordinate axes. The other configurations are the same as those in the first embodiment.

Figure 4:
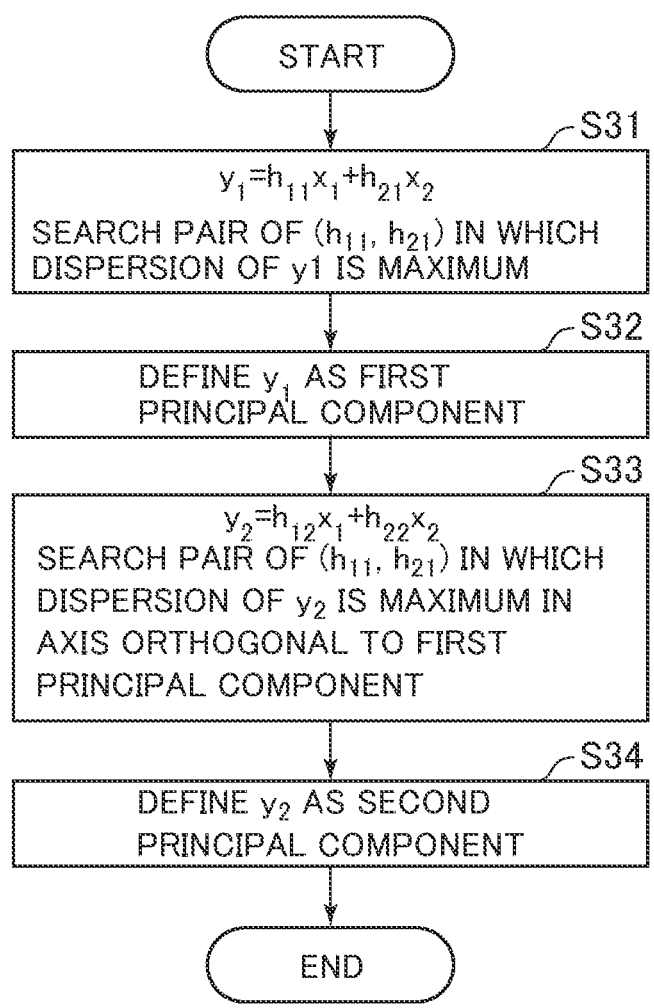
FIG. 4 is a flow chart showing an example of a process that is performed in a concentrator according to a second embodiment of the present invention.
Figure 5:
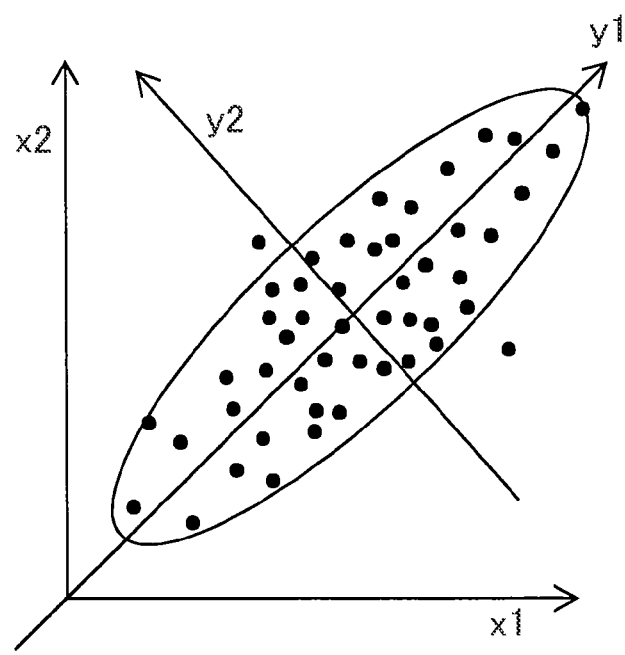
FIG. 5 is a graph showing a coordinate axis conversion according to the second embodiment of the present invention.

FIG. 4 is a flowchart showing an example of a process to be performed by a concentrator 5 according to the second embodiment of the present invention. The process is implemented in Step S4 of FIG. 2 of the first embodiment. As shown in FIG. 5, the second embodiment shows an example in which statistical parameters are (x1, x2). FIG. 5 is a graph showing an example of a coordinate axis conversion according to the second embodiment of the present invention.

The concentrator 5 searches a set of (h11, H21) where the dispersion of y1 is the maximum by the following expression (S31).

$$y1 = h11 \times x1 + h21 \times x2$$

The concentrator 5 defines y1 of the search result as a first principal component (S32).

Then, the concentrator 5 searches a set of (h12, h22) where the dispersion of y2 is the maximum in an axis orthogonal to the first principal component by the following expression (S33).

$$y2 = h12 \times x1 + h22 \times x2$$

The concentrator 5 defines y2 of the search result as a second principal component (S34).

With the above processing, the accuracy of the abnormality detection can be improved by rotating the coordinates of the principal components.

In the example in which the operating state of the processing machine in the mass production factory described in the first embodiment is monitored by the acceleration sensor, the three principal components of $\sigma$, $N_0$, and p3 are set. This corresponds to a configuration in which a principal axis of a cluster sphere is considered to be perpendicular to a $\sigma$ axis, an $N_0$ axis, and a p3 axis. However, as in the example described in the second embodiment, the principal axis of the cluster sphere is mostly inclined relative to the respective coordinate axes, and the precision of monitoring can be enhanced through a procedure such that rotating operation is performed, for example, on a $\sigma$-$N_0$ plane and an $N_0$-p3 plane.

Third Embodiment

In a third embodiment, the wireless sensor terminal 1 operated in the monitoring mode of the first embodiment is operated again in the training mode, the concentrator 5 updates the principal components to update the principal component list 120 of the wireless sensor terminal 1. In the third embodiment, the retraining and a process of updating the principal component list 120 are added to the configuration of the first embodiment, and the other configurations are the same as those of the first embodiment.

In the facility such as a factory, an operating state of the facility may change due to a change in placement, a replacement of components due to maintenance, or the like, or the operating state of the facility may change due to aging, or the like. In order that the wireless sensor terminal 1 detects the abnormality and the presage of abnormality following such changes in the facility, the operating state of the facility is learned to update the principal component list 120.

FIG. 6 is a sequence diagram showing an example of a process to be performed by the sensing system according to the third embodiment of the present invention.

Steps S41 to S43 are the same as Steps S1 to S6 shown in FIG. 2 of the first embodiment during the initial training period of introduction of the wireless sensor terminal 1. The concentrator 5 collects the sensor data received from the wireless sensor terminal 1 until a predetermined accumulation period has elapsed (S41), subjects the collected data to the statistic calculation, the clustering, and the principal component analysis to generate the principal component list 120 (S42), and transmits the generated principal component list 120 to the wireless sensor terminal 1 (S43).

Upon receiving the principal component list 120, the wireless sensor terminal 1 switches to the monitoring mode and operates. In Steps S44 to S46, as in Steps S7 to S10 shown in FIG. 2 of the first embodiment, the wireless sensor terminal 1 collects the sensor data, calculates the principal components, and transmits the principal component data to the concentrator 5 (S44). Upon receiving the principal component data, the concentrator 5 compares the statistics of the principal component data with a threshold to determine the state (S45), and transmits the state determination result to the server 8 (S46).

Next, when a predetermined operating period has elapsed to reach an update cycle of the principal component list 120, the concentrator 5 transmits a command for switching the operating mode to the training mode to the wireless sensor terminal 1 (S47). The command to switch to the training mode can be issued by an administrator or the like of the concentrator 5 through an input device not shown.

Further, the update cycle of the principal component list 120 can be appropriately set according to the state of the facility, and is, for example, one month.

The wireless sensor terminal 1 switches to the training mode and operates and transmits the sensor data to the concentrator 5 (S48). The concentrator 5 implements a retraining (S49) in the same manner as that of the initial training (S42). In other words, the concentrator 5 calculates the statistics from the collected sensor data to perform clustering, selects a predetermined number of statistics in descending order of the dispersion as the principal components for each of the clusters, and generates and updates the principal component list 120 (S50).

The concentrator 5 transmits the updated principal component list 120 to the wireless sensor terminal 1 (S51). Upon receiving the updated principal component list 120, the wireless sensor terminal 1 updates the principal component list 120 and resets the kind of the statistics to be calculated according to the updated principal component list 120. The wireless sensor terminal 1 then returns to the monitoring mode, calculates the statistics according to the sensor data measured by the sensor 2, and transmits the calculated statistics as the principal component data to the concentrator 5 (S52). Thereafter, the wireless sensor terminal 1 continues to operate in the monitoring mode described in the first embodiment.

As described above, the wireless sensor terminal 1 operating in the monitoring mode is switched again to the training mode, and the concentrator 5 again generates and updates the principal component list 120 according to the sensor data, thereby being capable of setting the principal component data corresponding to the state of the facility and capable of maintaining the detection accuracy of the abnormality or the presage of abnormality.

Fourth Embodiment

In a fourth embodiment, the statistic calculation unit 720 of the concentrator 5 shown in FIG. 1 of the first embodiment is stopped or deleted so that the statistics are calculated by only the statistic calculation unit 110 of the wireless sensor terminal 1. The other configurations are the same as those in the first embodiment.

FIG. 7 is a sequence diagram showing an example of a process to be performed by a sensing system according to the fourth embodiment of the present invention.

First, the wireless sensor terminal 1 newly installed in a facility to be monitored operates in a training mode. In the fourth embodiment, the wireless sensor terminal 1 in the training mode does not transmit the sensor data as it is unlike the first embodiment, but transmits multiple statistics calculated every predetermined collection period (for example, 100 msec) (S61).

The wireless sensor terminal 1 calculates all of the statistics of the items (1) to (12) shown in the first embodiment for the sensor data collected in a predetermined collection period and transmits the calculated statistics to the concentrator 5.

The concentrator 5 accumulates all of the received statistics until a predetermined accumulation period (for example, one day) has elapsed.

After the predetermined accumulation period has elapsed, the concentrator 5 performs processing in the same manner as that in Steps S4 to S6 shown in FIG. 2 of the first embodiment. In other words, the concentrator 5 clusters each of the accumulated statistics to generate clusters (S62), and performs a principal component analysis on each of the clusters to calculate the dispersion of each cluster. Then, the concentrator 5 sorts the dispersion of each cluster in descending order and selects the dispersion from a top to a predetermined rank (for example, third rank) as the principal components (S63). The concentrator 5 generates the principal component list 120 storing the selected principal components (statistics), and transmits the generated principal component list 120 to the wireless sensor terminal 1 (S64).

With the above processing, the training mode is completed. In the fourth embodiment, since the wireless sensor terminal 1 does not transmit the sensor data as it is, but transmits the sensor data as set statistic data, the amount of data to be transmitted is reduced, and the power consumption of the wireless sensor terminal 1 can be reduced.

Upon receiving the principal component list 120, the wireless sensor terminal 1 selects the statistics for processing the sensor data based on the principal components set in the principal component list 120, and starts the monitoring mode.

Steps S65 to S67 are the same as Steps S7 to S10 shown in FIG. 2 of the first embodiment. The wireless sensor terminal 1 collects the sensor data and calculates the principal components to transmit the principal component data to the concentrator 5 (S65). Upon receiving the principal component data, the concentrator 5 compares the statistics of the principal component data with a threshold, determines the state (S66), and transmits the state determination result to the server 8 (S67).

Next, when a predetermined operating period has elapsed to reach the update cycle of the principal component list 120, the concentrator 5 transmits a command for switching the operating mode to the training mode to the wireless sensor terminal 1 (S68).

The wireless sensor terminal 1 switches to the training mode to operate, converts the sensor data in the predetermined collection period into all of the set statistics in the same manner as that in the above Step S61, and transmits the converted statistics to the concentrator 5 (S69).

The concentrator 5 performs retraining in the same manner as that of the initial training (S62, S63). In other words, the concentrator 5 clusters all of the collected statistics, selects a predetermined number of statistics as the principal components in descending order of the dispersion for each of the clusters, and generates and updates the principal component list 120 (S70).

The concentrator 5 transmits the updated principal component list 120 to the wireless sensor terminal 1 (S71). Upon receiving a new principal component list 120, the wireless sensor terminal 1 updates the principal component list 120 held in the memory 32, and then switches to the monitoring mode, calculates the statistics according to the sensor data, and transmits the calculated statistics to the concentrator 5 as the principal component data (S72). Thereafter, the wireless sensor terminal 1 continues to operate in the monitoring mode described in the first embodiment.

As described above, in the fourth embodiment, since the calculation of the statistics is aggregated in the wireless sensor terminal 1, there is no need to transmit the sensor data in the training mode as it is, and the power consumption due to transmission can be reduced.

Fifth Embodiment

In a fifth embodiment, the wireless sensor terminals 1-1 to 1-N and the concentrator 5 shown in FIG. 1 of the first embodiment are installed in devices 80-1 to 80-M each having one or more actuators 60-1 to 60-M 80-K.

FIG. 8 is a block diagram showing an example of a sensing system according to the fifth embodiment of the present invention.

In FIG. 8, the structures and operations of respective blocks denoted by reference numerals 1-1 to 1-N and 5 to 9 and 10 are the same as those of the first to fourth embodiments.

In FIG. 8, a recognition processing unit 40 is configured to determine a state of a monitoring target based on a state determination result output from the signal processing unit 70. A control processing unit 50 is configured to generate and output operation commands of the actuators 60-1 to 60-M based on the determination result of the recognition processing unit 40. A second server 11 is configured to aggregate a state determination result output from the signal processing unit 70 installed in each of the devices 80-1 to 80-K, a state determination result output from the recognition processing unit 40, and operation data output from the control processing unit 50.

Further, the second server 11 learns the respective optimum state determination results, state determination results, and operation commands in various scenes in various places based on a result of aggregating the state determination results, the state determination results, and the operation commands in the multiple devices 80-1 to 80-K, and transmits signals for updating the respective processing algorithms of the signal processing unit 70, the recognition processing unit 40, and the control processing unit 50 installed in each of the devices 80-1 to 80-K to optimum states (for example, lower power consumption state) over the network 10.

As described above, in the fifth embodiment, a feedback loop for controlling an actuator is formed based on the sensing of the state to be monitored and the state determination result. Therefore, with the addition of a function of the second server 11, the operation of the overall system can be further improved (for example, the power consumption can be reduced).

In the fifth embodiment, some or all of the wireless sensor terminals 1-1 to 1-N may be connected to each other by a wired network such as CAN (controller area network), Ether, or SerDes instead of the wireless network 9.

In the fifth embodiment, the devices 80-1 to 80-K may be fixed devices such as assembling devices in an industrial field or mobile devices such as automobiles, trains, or construction machines.

<Overview>

The present invention is not limited to the embodiments described above, but includes various modifications. For example, the above-mentioned embodiments are described in detail for the purpose of describing the present invention in an easy-to-understand manner. However, the present invention does not always provide all of the configurations described above. Also, a part of one configuration example can be replaced with another configuration example, and the configuration of one embodiment can be added with the configuration of another embodiment. Also, in a part of the respective configuration examples, another configuration can be added, deleted, or replaced independently or in combination.

Also, parts or all of the above-described respective configurations, functions, processors, processing means may be realized, for example, as an integrated circuit, or other hardware. Also, the above respective configurations and functions may be realized by allowing the processor to interpret and execute programs for realizing the respective functions. That is, the respective configurations and functions may be realized by software. The information on the program, table, and file for realizing the respective functions can be stored in a storage device such as a memory, a hard disc, or an SSD (solid state drive), or a storage medium such as an IC card, an SD card, or a DVD.

Also, the control lines and the information lines necessary for description are illustrated, and all of the control lines and the information lines necessary for products are not illustrated. In fact, it may be conceivable that most of the configurations are connected to each other.

<Supplement>

Representative aspects of the present invention other than those described in the claims will be described below.

<16>

The sensing method according to <13>, wherein the third step rotates a coordinate axis of the generated cluster.

<17>

The sensing method according to <10>, wherein the concentrator includes a training mode for determining the principal component list and a monitoring mode in which the wireless sensor terminal outputs the principal component data with the use of the principal component list, and the concentrator further includes:

a ninth step of transmitting a command for switching to the training mode to the wireless sensor terminal;

a tenth step of calculating a feature quantity based on the data received from the wireless sensor terminal, determining a principal component according to the feature quantity by the principal component analysis, updating the principal component list corresponding to the principal component, and transmitting the updated principal component list to the wireless sensor terminal; and an eleventh step in which upon receiving the updated principal component list, the wireless sensor terminal resets the kind of calculated statistic according to the updated principal component list, and returns to the monitoring mode.

<18>

The concentrator according to <15>, wherein the second wireless communication unit receives plural kinds of statistics from the wireless sensor terminal, and the second signal processing unit calculates the feature quantity of each of the plural kinds of statistics, selects the statistic, which is a principal component, from the respective calculated feature quantities by the principal component analysis, and transmits the selected statistic as a principal component list to the wireless sensor terminal.

<19>

The concentrator according to <15>, wherein the second wireless communication unit receives the sensor data, and the second signal processing unit selects all of plural kinds of statistics set in advance, calculates all of the statistics according to the sensor data, calculates the feature quantity for each of all of the statistics, selects the statistic, which is a principal component, according to the respective calculated feature quantities by the principal component analysis, and transmits the selected statistic as the principal component list to the wireless sensor terminal.

<20>

The concentrator according to the <18> or <19>, wherein the second signal processing unit generates a cluster for each of the statistics as the feature quantity.

<21>

The concentrator according to the <20>, wherein the second signal processing unit calculates dispersion according to the respective feature quantities by the principal component analysis, selects the statistics corresponding to a predetermined number of feature quantities in descending order of the dispersion as a principal component analysis, and outputs the selected statistic as a principal component list.

<22>

The concentrator according to the <20>, wherein the second signal processing unit rotates a coordinate axis of the cluster generated by the clustering in the calculation of the feature quantity.

<23>

The concentrator according to <15>, wherein the concentrator includes a training mode for determining the principal component list and a monitoring mode for receiving principal component data from the wireless sensor terminal, and the second signal processing unit transmits a command for switching to the training mode to the wireless sensor terminal, calculates the feature quantity based on the data received from the wireless sensor terminal, determines a principal component according to the feature quantity by a principal component analysis, updates the principal component list corresponding to the principal component, and transmits the updated principal component list to the wireless sensor terminal.

<24>

A program for controlling a concentrator including a processor and a memory, which causes the concentrator to execute:

a first step of calculating a feature quantity based on received data;

a second step of determining a principal component according to the feature quantity by a principal component analysis;

a third step of generating a principal component list corresponding to the principal component; and a fourth step of transmitting the generated principal component list.

<25>

A program for controlling a wireless sensor terminal including a sensor, a processor, and a memory which causes the wireless sensor terminal to execute:
- a first step of processing sensor data measured by the sensor;
- a second step of transmitting the processed data;
- a third step of receiving a principal component list and determining a statistic for calculating principal component data according to the sensor data based on the principal component list; and
- a fourth step of calculating the determined statistic according to the sensor data and transmitting the calculated statistic as principal component data.

What is claimed is:

1. A sensing system comprising:
   a wireless sensor terminal that includes a sensor, a processor, and a memory; and
   a concentrator that includes a processor and a memory and is connected to the wireless sensor terminal,
   wherein the wireless sensor terminal includes:
   a first signal processing unit that processes sensor data measured by the sensor; and
   a first wireless communication unit that transmits the data output by the first signal processing unit, and
   the concentrator includes:
   a second wireless communication unit that communicates with the first wireless communication unit; and
   a second signal processing unit that calculates a feature quantity based on the data received from the wireless sensor terminal, determines a principal component according to the feature quantity by a principal component analysis, and generates a principal component list corresponding to the principal component.

2. The sensing system according to claim 1,
   wherein the concentrator transmits the generated principal component list from the second wireless communication unit to the wireless sensor terminal, and
   the wireless sensor terminal determines a statistical value for calculating principal component data according to the sensor data based on the principal component list received by the first wireless communication unit, calculates the determined statistical value according to the sensor data to output the calculated statistical value as the principal component data, and transmits the principal component data from the first wireless communication unit to the concentrator.

3. The sensing system according to claim 1,
   wherein the wireless sensor terminal selects all of preset plural kinds of statistical values, calculates all of the statistical values according to the sensor data measured by the sensor, and the first wireless communication unit transmits all of the calculated statistical values to the concentrator, and
   the concentrator receives the statistical values, calculates the feature quantity for each of the plural kinds of statistical values, selects the statistical value, which is a principal component, from each of the calculated feature quantities by the principal component analysis, and transmits the selected statistical value as the principal component list to the wireless sensor terminal.

4. The sensing system according to claim 1,
   wherein the wireless sensor terminal outputs the sensor data measured by the sensor and transmits the output sensor data to the concentrator, and
   the concentrator receives the sensor data by the second wireless communication unit, selects all of preset plural kinds of statistics, calculates all of the statistics according to the sensor data, calculates the feature quantity for each of the statistics, selects the statistical value, which is a principal component, from each of the calculated feature quantities by the principal component analysis, and transmits the selected statistical value as the principal component list to the wireless sensor terminal.

5. The sensing system according to claim 3,
   wherein the concentrator generates a cluster for each of the statistics as the feature quantity.

6. The sensing system according to claim 5,
   wherein the concentrator calculates dispersion according to each of the feature quantities by the principal component analysis, selects the statistics corresponding to a predetermined number of feature quantities as the principal component analysis in descending order of the dispersion, and outputs the selected statistics as the principal component list.

7. The sensing system according to claim 5,
   wherein the concentrator rotates a coordinate axis of the generated cluster.

8. The sensing system according to claim 2,
   wherein the sensing system includes a training mode for determining the principal component list and a monitoring mode in which the wireless sensor terminal outputs the principal component data with the use of the principal component list,
   the concentrator transmits a command for switching to the training mode to the wireless sensor terminal, calculates the feature quantity based on the data received from the wireless sensor terminal, determines a principal component according to the feature quantity by the principal component analysis, updates the principal component list corresponding to the principal component, and transmits the updated principal component list to the wireless sensor terminal, and
   upon receiving the updated principal component list, the wireless sensor terminal resets the kind of calculated statistic according to the updated principal component list, and returns to the monitoring mode.

9. A sensing method for allowing a concentrator connected to a wireless sensor terminal including a sensor and a processor to collect data, the method comprising:
   a first step of allowing the wireless sensor terminal to process sensor data measured by the sensor;
   a second step of allowing the wireless sensor terminal to transmit the processed data to the concentrator;
   a third step of allowing the concentrator to calculate a feature quantity based on data received from the wireless sensor terminal;
   a fourth step of allowing the concentrator to determine a principal component according to the feature quantity by a principal component analysis; and
   a fifth step of allowing the concentrator to generate a principal component list corresponding to the principal component.

10. The sensing method according to claim 9, further comprising:
    a sixth step of allowing the concentrator to transmit the generated principal component list to the wireless sensor terminal;
    a seventh step of allowing the wireless sensor terminal to determine a statistic for calculating principal component data according to the sensor data based on the received principal component list; and
    an eighth step of allowing the wireless sensor terminal to calculate the determined statistic according to the sensor data to output the calculated statistic as the principal component data, and transmit the output principal component data to the concentrator.

11. The sensing method according to claim 9,
wherein the first step selects all of preset plural kinds of statistics and calculates all of the statistics according to the sensor data measured by the sensor,
the second step transmits all of the calculated statistics to the concentrator,
the third step receives the statistic and calculates the feature quantity for each of the plural kinds of statistics,
the fourth step selects the statistic, which is a principal component, according to each of the calculated feature quantities by the principal component analysis, and
the fifth step transmits the selected statistic as the principal component list to the wireless sensor terminal.

12. The sensing method according to claim 9,
wherein the first step outputs the sensor data measured by the sensor,
the second step transmits the output sensor data to the concentrator,
the third step receives the sensor data, selects all of the preset plural kinds of statistics, calculates each of all of the statistics according to the sensor data, and calculates each of the feature quantities according to the statistics,
the fourth step selects the statistic, which is a principal component, according to each of the calculated feature quantities by the principal component analysis, and
the fifth step transmits the selected statistic as the principal component list to the wireless sensor terminal.

13. The sensing method according to claim 11,
wherein the third step generates a cluster for each of the statistics as the feature quantity.

14. The sensing method according to claim 13,
wherein the fourth step calculates dispersion according to the respective feature quantities by the principal component analysis, selects the statistics corresponding to a predetermined number of feature quantities as the principal component analysis in descending order of the dispersion, and outputs the selected statistic as the principal component list.

15. A concentrator that includes a processor and a memory and communicates with a wireless sensor terminal, the concentrator comprising:
a second wireless communication unit that communicates with the wireless sensor terminal; and
a second signal processing unit that calculates a feature quantity based on data received from the wireless sensor terminal, determines a principal component according to the feature quantity by a principal component analysis, and generates a principal component list corresponding to the principal component,
wherein the second wireless communication unit transmits the generated principal component list from the second wireless communication unit to the wireless sensor terminal, and receives principal component data from the wireless sensor terminal.

* * * * *